(12) United States Patent
Pisklak et al.

(10) Patent No.: US 11,242,479 B2
(45) Date of Patent: Feb. 8, 2022

(54) GEOPOLYMER CEMENT FOR USE IN SUBTERRANEAN OPERATIONS

(71) Applicant: Halliburton Energy Services, Inc., Houston, TX (US)

(72) Inventors: Thomas Jason Pisklak, Cypress, TX (US); Heloisa Helena Fabricio Fernandes, The Woodlands, TX (US); Megan Elizabeth McDaniel, Natchitoches, LA (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 16/791,506

(22) Filed: Feb. 14, 2020

(65) Prior Publication Data

US 2021/0253932 A1 Aug. 19, 2021

(51) Int. Cl.
*C09K 8/467* (2006.01)
*C09K 8/487* (2006.01)
*C09K 8/42* (2006.01)
*E21B 33/14* (2006.01)
(Continued)

(52) U.S. Cl.
CPC ............. *C09K 8/467* (2013.01); *C09K 8/426* (2013.01); *C09K 8/428* (2013.01); *C09K 8/487* (2013.01); *E21B 33/14* (2013.01); *C04B 12/005* (2013.01); *C04B 14/06* (2013.01)

(58) Field of Classification Search
CPC .......... C09K 8/46; C09K 8/467; C09K 8/426; C09K 8/428; C09K 8/42; C09K 8/50; C09K 8/493; C09K 8/48; C09K 8/487; C09K 8/473; C04B 14/06; C04B 12/005; E21B 33/138; E21B 33/13; E21B 33/14
See application file for complete search history.

(56) References Cited

U.S. PATENT DOCUMENTS

| | | | | |
|---|---|---|---|---|
| 5,358,044 A | * | 10/1994 | Hale | .................... C04B 18/049 |
| | | | | 166/293 |
| 7,794,537 B2 | | 9/2010 | Barlet-Gouedard et al. | |
| 7,846,250 B2 | | 12/2010 | Barlet-Gouedard et al. | |

(Continued)

FOREIGN PATENT DOCUMENTS

| WO | 2014/100604 A1 | 6/2014 |
|---|---|---|
| WO | 2018/009199 A1 | 1/2018 |

OTHER PUBLICATIONS

Calcium Hydroxide, International Labour Organization, World Health Organization, retrieved from https://www.cdc.gov/niosh/npg/npgd0092.html, Jan. 28, 2021 (Year: 1997).*

(Continued)

*Primary Examiner* — Angela M DiTrani Leff (74) *Attorney, Agent, or Firm* — Thomas Rooney; Baker Botts L.L.P.

(57) ABSTRACT

Methods and compositions for using geopolymers to create storable cementitious slurries used for oil and gas well cementing are provided. The methods of the present disclosure include providing a set-delayed geopolymer cement composition including a geopolymer; activating the set-delayed geopolymer cement composition; introducing the set-delayed geopolymer cement composition into at least a portion of a subterranean formation; and allowing the set-delayed geopolymer cement composition to set in the subterranean formation.

20 Claims, 3 Drawing Sheets

(51) Int. Cl.
*C04B 14/06* (2006.01)
*C04B 12/00* (2006.01)

(56) References Cited

U.S. PATENT DOCUMENTS

| | | | |
|---|---|---|---|
| 8,360,145 B2 | 1/2013 | Kalman et al. | |
| 8,535,437 B2 | 9/2013 | Perishikova et al. | |
| 8,685,903 B2 | 4/2014 | Ravi et al. | |
| 8,851,173 B2 | 10/2014 | Brothers et al. | |
| 9,189,685 B2* | 11/2015 | Nosaka | G01S 3/783 |
| 9,206,343 B2 | 12/2015 | Perishikova et al. | |
| 9,206,345 B2 | 12/2015 | Weaver et al. | |
| 9,222,010 B2 | 12/2015 | Porcherie et al. | |
| 9,346,711 B2 | 5/2016 | Chatterji et al. | |
| 9,394,202 B2 | 7/2016 | Porcherie et al. | |
| 9,534,165 B2 | 1/2017 | Agapiou et al. | |
| 10,266,746 B1 | 4/2019 | Rahman et al. | |
| 10,457,601 B2* | 10/2019 | Thomas | C04B 14/14 |
| 10,876,042 B2* | 12/2020 | Qu | C09K 8/665 |
| 2008/0028994 A1* | 2/2008 | Barlet-Gouedard | C09K 8/467 |
| | | | 106/811 |
| 2008/0066655 A1* | 3/2008 | Fraser | C04B 28/04 |
| | | | 106/709 |
| 2011/0073311 A1 | 3/2011 | Porcherie et al. | |
| 2011/0284223 A1* | 11/2011 | Porcherie | C04B 28/006 |
| | | | 166/292 |
| 2012/0241155 A1 | 9/2012 | Ali et al. | |
| 2013/0266380 A1* | 10/2013 | Capron | F16L 1/24 |
| | | | 405/184.4 |
| 2014/0048264 A1* | 2/2014 | Chatterji | C09K 8/46 |
| | | | 166/292 |
| 2014/0076568 A1 | 3/2014 | McDonald et al. | |
| 2014/0166285 A1 | 6/2014 | Santra et al. | |
| 2014/0174741 A1* | 6/2014 | Agapiou | C04B 40/0658 |
| | | | 166/293 |
| 2014/0367103 A1 | 12/2014 | Michaux et al. | |
| 2015/0299042 A1* | 10/2015 | Hesse | C04B 24/2688 |
| | | | 524/5 |
| 2015/0315875 A1 | 11/2015 | Chatterji et al. | |
| 2015/0321954 A1* | 11/2015 | Chalmers | C04B 28/006 |
| | | | 106/707 |
| 2016/0153274 A1* | 6/2016 | Hull | E21B 43/267 |
| | | | 166/280.2 |
| 2017/0137322 A1 | 5/2017 | Seo | |
| 2017/0137694 A1 | 5/2017 | van Oort et al. | |
| 2017/0334779 A1 | 11/2017 | Gong et al. | |
| 2018/0029937 A1 | 2/2018 | Kondralowicz et al. | |
| 2019/0367797 A1* | 12/2019 | Morgan | C09K 8/467 |

OTHER PUBLICATIONS

International Search Report and Written Opinion issued in related PCT Application No. PCT/US2020/018573 dated Nov. 9, 2020, 12 pages.
Synthesis and Characterization of materials based on inorganic polymers of alumina and silica: sodium polysialate polymers. Int. J. Inorg. Mat., (2000), 2, 309-317.

* cited by examiner

GEOPOLYMER CEMENT FOR USE IN SUBTERRANEAN OPERATIONS

BACKGROUND

The present disclosure relates to methods and compositions for treating subterranean formations.

Cement compositions may be used in a variety of subterranean operations. For example, in subterranean well construction, a pipe string (e.g., casing, liners, expandable tubulars, etc.) may be run into a well bore and cemented in place. The process of cementing the pipe string in place is commonly referred to as "primary cementing." In a primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A broad variety of cement compositions have been used in subterranean cementing operations. In some instances, set-delayed cement compositions have been used. Set-delayed cement compositions are characterized by remaining in a pumpable fluid state for an extended period of time (e.g., at least about 1 day to about 2 weeks or more). When desired for use, the set-delayed cement compositions should be capable of being activated whereby reasonable compressive strengths are developed. For example, a cement set accelerator may be added to a set-delayed cement composition whereby the composition sets into a hardened mass. Among other things, the set-delayed cement composition may be suitable for use in well bore applications, for example, where it is desired to prepare the cement composition in advance. This may allow, for example, the cement composition to be stored prior to its use. In addition, this may allow, for example, the cement composition to be prepared at a convenient location and then transported to the job site. Accordingly, capital expenditures may be reduced due to a reduction in the need for on-site bulk storage and mixing equipment. This may be particularly useful for offshore cementing operations where space onboard the vessels may be limited.

BRIEF DESCRIPTION OF THE DRAWINGS

These drawings illustrate certain aspects of some of the embodiments of the present disclosure, and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to methods and compositions for treating subterranean formations. More particularly, the present disclosure relates to methods and compositions for using geopolymers to create a storable cementitious slurries used for oil and gas well cementing, as well as a method of cementing an oil or gas well using the storable slurry.

Broad varieties of cement compositions may be used in subterranean cementing operations. In some instances, set-delayed cement compositions, may be used. Extended life slurries ("ELS") or set-delayed cement compositions are characterized by remaining in a pumpable fluid state for an extended period of time (e.g., at least about 1 day to about 2 weeks or more). When ready to use, the set-delayed cement composition should be able to be activated to exhibit an increase in compressive strength. Set-delayed cement compositions have been developed before, but challenges still exist with their successful use in oil-well cementing operations and activities. For instance, set-delayed cement compositions prepared with Portland cement may have undesirable gelation issues, which can limit their use and effectiveness in cementing operations. Other set-delayed compositions have been developed which include combinations of hydrated lime and quartz or hydrated line and natural glass. These compositions are useful at higher wellbore temperatures, however, often they are not as effective when used in in subterranean formations having lower bottom hole static temperatures (e.g., less than 140° F. (60° C.)) due to excessively long pump times and poor strength development.

Hydraulic cement compositions may be used in subterranean operations, particularly completion and remedial operations. For example, hydraulic cement compositions may be used in primary cementing operations whereby pipe strings, such as casings and liners, are cemented in wellbores. Hydraulic cement compositions also may be used in remedial cementing operations such as plugging highly permeable zones or fractures in wellbores, plugging cracks and holes in pipe strings, and the like.

A variety of hydraulic cement compositions may be used in subterranean cementing operations with the most common cement compositions including Portland cement. However, Portland cement has drawbacks in its method of preparation, methods of implementation, and final set compositions. Portland cement may generally be prepared by heating a mixture of raw materials including calcium oxide, silicon oxide, aluminum oxide, ferric oxide, and magnesium oxide in a kiln to approximately 2732° F. (1500° C.). Thus, the energy requirements to produce Portland cement may be quite high, and heat loss during production can further cause actual energy requirements to be even greater. The manufacturing process of Portland cements also has batch-to-batch variations that may yield unpredictable results when applied in a wellbore. Additionally, the Portland cement slurries may have finite set times, thereby limiting the amount of time that the cement slurry may be stored prior to use.

In addition to manufacturing drawbacks, the implementation of Portland cements in subterranean formations also may have drawbacks. Salts, particularly multivalent salts, often cause issues during the pumping and installation of a Portland cement. For example, when exposed to magnesium or calcium salts, Portland cement slurries may rapidly viscosify to a point that the cement is no longer pumpable. In subterranean formations, magnesium and calcium salts may be encountered in brines, evaporite minerals, and salt domes. To mitigate this effect, engineers may add scale inhibitors, chelating agents, or other additives to a treatment fluid containing Portland cement. However, this method is typically restricted because of very high material and installation costs.

Additionally, once the Portland cements are set within a wellbore, corrosive components, like salts, carbonic acid, and hydrogen sulfide, found within some subterranean formations may cause failure of Portland cement structure. As used herein, the term "corrosive" refers to a substance that destroys or irreversibly damages another surface or substance with which it comes into contact. For example, loss of metal due to chemical or electrochemical reactions is a commonly known form of corrosion. Corrosion rates may vary depending on the time, temperature, corrosive component, pH, and other physical and chemical variables. For example, dissolved carbon dioxide and carbonic acid can attack Portland cements by converting calcium hydroxide to the more stable calcium carbonate and/or calcium bicarbonate. First, dissolved carbon dioxide may convert to carbonic acid thereby lowering the local pH. The rate of conversion may depend on temperature, partial pressure of carbon dioxide, and salt concentration. Second, carbonation of the Portland cement may occur which may cause (a) densification leading to increased hardness and reduced permeability thereby decreasing $CO_2$ diffusion and (b) volume expansion of up to 6%, which may lead to development of micro to macro cracks in extreme cases. Both of these results may be due to an increase in mass (from chemical consumption of $CO_2$) within the volume defined by the solid set cement matrix. Finally, the long-term phenomenon of dissolution of $CaCO_3$ may occur when the cement is surrounded by water containing dissolved $CO_2$ for extended periods of time. Dissolution of $CaCO_3$ may increase porosity and/or permeability thereby decreasing overall mechanical strength. Decreased cement integrity may lead to inefficient zonal isolation and in extreme cases complete failure of the cement composition.

Among the many potential advantages to the methods and compositions of the present disclosure, only some of which are alluded to herein, the methods, compositions, and systems of the present disclosure may be used for applications where it is desired to prepare cement compositions in advance. Advanced slurry preparations may be desired for many reasons. For example, advanced preparation could allow the cement composition to be stored and tested prior to application. The cement composition could be prepared at a convenient location, and transported to the job site. The cement composition could also be prepared at the job site and stored for days or weeks until needed during well construction activities. Capital expenditures may be reduced due to a decrease in the need for on-site bulk storage, mixing equipment, and personnel.

The methods and systems of the present disclosure provide set-delayed geopolymer cement compositions that may include one or more geopolymer materials. In certain embodiments, the geopolymer materials of the present disclosure may include an aluminosilicate source, a metal silicate source, an alkali activator, and water. In one or more embodiments, components of the geopolymer material may react to form a geopolymer. A geopolymer may be described as an inorganic polymer that forms long-range, covalently bonded, non-crystalline networks. Geopolymers also may be described as a class of settable materials which rely on the dissolution and subsequent condensation of aluminosilicate precursors to form a hardened mass. Geopolymers also may be referred to as polysialates.

The production of a geopolymer may be called geosynthesis. In some embodiments, geosynthesis may be a reaction process that may involve naturally occurring aluminosilicates. In some embodiments, geopolymers may be formed by chemical dissolution and subsequent re-condensation of various aluminosilicates and silicates to form a 3D-network or three-dimensional mineral polymer. In certain embodiments, geopolymers based on aluminosilicates may be designed as poly(silate), which is a shorter version of poly(silicon-oxo-aluminate). In one or more embodiments, the silate network may include silicate and aluminate tetrahedrals linked alternately by sharing all oxygens, with $Al^{3+}$ and $Si^{4+}$ in IV-fold coordination with oxygen. In certain embodiments, the geopolymer composition may be present in the cementing fluid in any suitable concentration or loading.

Equation 1 below provides a geosynthesis reaction in accordance with certain embodiments of the present disclosure, which may not be representative of all geosynthesis reactions.

$$Al_2O_3+SiO_2+wH_2O \xrightarrow{MOH} M((-SiO_2)_z-AlO_2)_n+wH_2O \qquad (1)$$

As depicted in Equation 1, in certain embodiments, aluminate, silicate, and metal hydroxide react to form the geopolymer. Further, in those embodiments, the metal hydroxide, MOH, may include group 1 and 2 hydroxides. In one or more embodiments, suitable metal hydroxides may include, but are not limited to, potassium hydroxide, sodium hydroxide, and calcium hydroxide. In Equation 1, the degree of polymerization is denoted by n and the atomic ratio of Si to Al is denoted by z.

Equation 2 below illustrates an embodiment wherein the metal ion may act as a counter ion to counterbalance the negative charge of the aluminum metal.

(2)

Figure 1:
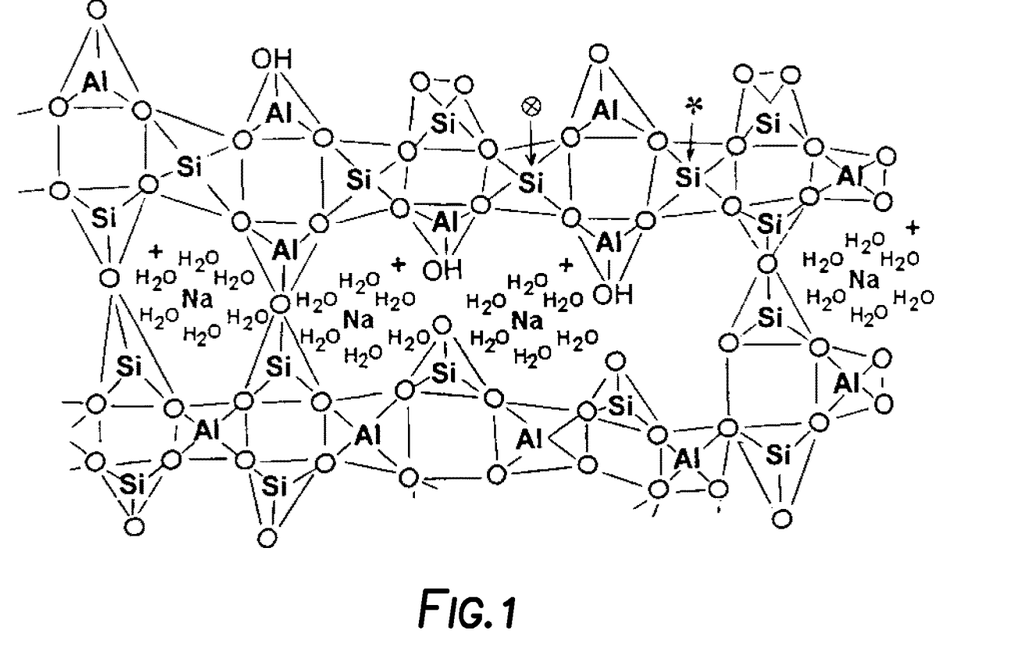
FIG. 1 is a diagram illustrating a geopolymer composition that may be used in accordance with certain embodiments of the present disclosure.

FIG. 1 illustrates a three-dimensional structure of an exemplary embodiments of a geopolymer in accordance with the methods and systems of the present disclosure. In one or more embodiments, the geosynthesis reaction may be kinetically favored due to the presence of the counter anion.

In some embodiments, the metal hydroxide may act as an alkali activator for the geosynthesis reaction and as a stabilizing agent to the final polymer matrix. In certain embodiment, other compounds may act as alkali activators including, but are not limited to, chloride salts such as KCl, CaCl, and NaCl, carbonates such as $Na_2CO_3$, silicates such as sodium silicate, aluminates such as sodium aluminate, and ammonium hydroxide. In each case, the cation in the compound also may act as a counter anion. In some embodiments, a metal hydroxide and salt may be used together. In other embodiments, combinations of any salts, silicates, carbonates, aluminates, metal hydroxides, and ammonium hydroxide may act as an alkali activator. In one or more embodiments, the alkali activator may be dry mixed with the other geopolymer components to make the geopolymer composition. In some embodiments, the alkali activator may be in an aqueous solution. In certain embodiments, the alkali activator may be included in an amount in the range of from about 0.1% to about 50.0% by weight of the geopolymer composition. In other embodiments, the alkali activator may be included in an amount in the range of from about 1.0% to about 30.0% by weight of the geopolymer composition. In still other embodiments, the alkali activator may be included in an amount in the range of from about 5.0% to about 15.0% by weight of the geopolymer composition.

The aluminosilicate source may include any suitable aluminosilicate. In certain embodiments, the aluminosilicate may be a mineral including aluminum, silicon, and oxygen, plus counter-cations. In one or more embodiments, the aluminosilicate source may be chosen based at least in part on the specific properties of the aluminosilicate. For example, some minerals such as andalusite, kyanite, and sillimanite are naturally occurring aluminosilicate sources that have the same composition, $Al_2SiO_5$, but differ in crystal structure. The differences in the crystal structure of the aluminosilicate may provide different properties. For example, each of andalusite, kyanite, or sillimanite may react more or less quickly and to different extents at the same temperature and pressure due to the differing crystal structures. In some embodiments, the final geopolymer created from any one aluminosilicate may have both microscopic and macroscopic differences such as mechanical strength and thermal resistivity owing to the different aluminosilicate sources. In some embodiments, the aluminosilicate source may include, but is not limited to, metakaolin clays, calcined clays, partially calcined clays, kaolinite clays, lateritic clays, illite clays, volcanic rocks, mine tailings, blast furnace slag, and coal fly ash. In certain embodiments, the aluminosilicate source may be present in an amount in the range of from about 0.05% to about 50.0% by weight of the geopolymer composition. In other embodiments, the aluminosilicate source may be present in an amount in the range of from about 1.0% to about 45.0% by weight of the geopolymer composition. In still other embodiments, the aluminosilicate source may be present in an amount in the range of from about 1.75% to about 40.0% by weight of the geopolymer composition.

The metal silicate source may include any suitable metal silicate. A silicate may be any compound containing an anionic silicon compound. In some embodiments, the silicate may include an orthosilicate anion also known as silicon tetroxide anion, $(SiO_4)^{4-}$ or a hexafluorosilicate $(SiF_6)^{2-}$. In other embodiments, the silicate may include cyclic and single chain silicates which may have the general formula $(SiO_3^{2-})_n$ and sheet-forming silicates which may have the general formula $(Si_2O_5^{2-})_n$. In one or more embodiments, the silicate may have one or more metal cations associated with each silicate molecule. In some embodiments, suitable metal silicate sources and may include, but are not limited to, sodium silicate, magnesium silicate, and potassium silicate. In certain embodiments, the metal silicate source may be present in an amount in the range of from about 0.1% to about 50.0% by weight of the geopolymer cement composition. In other embodiments, the metal silicate source may be present in an amount in the range of from about 0.3% to about 40.0% by weight of the geopolymer cement composition. In still other embodiments, the metal silicate source may be present in an amount in the range of from about 0.6% to about 30.0% by weight of the geopolymer cement composition.

In one or more embodiments, the components of the geopolymer compositions may be combined in any order desired to form a geopolymer composition that can be placed into a subterranean formation or used as a component of a cementing fluid. In certain embodiments, the components of the geopolymer compositions may be combined using any mixing device compatible with the composition, including a bulk mixer, for example. In some embodiments, a geopolymer composition may be formed by dry blending dry components including the aluminosilicate source, the metal silicate source, and an alkali activator. In one or more embodiments, the dry blend of the geopolymer composition may then be combined with water (e.g., tap water, seawater, saltwater, etc.) to form a geopolymer slurry which may be included in a cementing fluid. In other embodiments, a dry blend of the geopolymer composition may be combined directly with other components of a cementing fluid to form said set-delayed geopolymer cementing fluid.

In certain embodiments, the set-delayed geopolymer cement compositions optionally may include a set retarder. Without intending to be limited to any theory or mechanism, the set retarder may act to inhibit the consolidation of the geopolymer cement composition. In some embodiments, the set retarder may include phosphonic acid, phosphonic acid derivatives, lignosulfonates, salts, organic acids, carboxymethylated hydroxyethylated celluloses, synthetic co- or terpolymers including sulfonate and carboxylic acid groups, borate compounds, derivatives thereof, or any mixture thereof. In one or more embodiments, the set retarders used in the set-delayed geopolymer cement compositions in the present disclosure may be phosphonic acid derivatives. In some embodiments, the set retarder may be present in the set-delayed geopolymer cement composition in an amount sufficient to delay the setting for a desired time. In some embodiments, the set retarder may be present in the set-delayed geopolymer cement compositions in an amount in the range of from about 0.01% to about 10.0% by weight of the geopolymer composition. In other embodiments, the set retarder may be present in the set-delayed geopolymer cement compositions in an amount in the range of from about 0.1% to about 8.0% by weight of the geopolymer composition. In still other embodiments, the set retarder may be present in the set-delayed geopolymer cement compositions in an amount in the range of from about 0.25% to about 5.0% by weight of the geopolymer composition. One of ordinary skill in the art, with the benefit of this disclosure, will recognize the appropriate amount of the set retarder to include for a chosen application. However, in some embodiments, the set-delayed geopolymer cement compositions of the present disclosure may be substantially, or entirely, free of any set retarder additive (other than the geopolymer composition).

Other additives suitable for use in subterranean cementing operations also may be included in embodiments of the set-delayed geopolymer cement compositions. Examples of such additives include, but are not limited to, weighting agents, lightweight additives, gas-generating additives, lost-circulation materials, and combinations thereof. In some embodiments, one or more of these additives may be added to the set-delayed geopolymer cement composition after storing but prior to placement of the set-delayed geopolymer cement composition into a subterranean formation. A person having ordinary skill in the art, with the benefit of this disclosure, will readily be able to determine the type and amount of additive useful for a particular application and desired result.

Those of ordinary skill in the art will appreciate that embodiments of the set-delayed geopolymer cement compositions of the present disclosure generally should have a density suitable for a particular application. In certain embodiments, the set-delayed geopolymer cement compositions may have a density in the range of from about 4.0 pounds per gallon ("lbm/gal") to about 25.0 lbm/gal. In other embodiments, the set-delayed geopolymer cement compositions may have a density in the range of from about 8.0 lbm/gal to about 20.0 lbm/gal. In still other embodiments, the set-delayed geopolymer cement compositions may have a density in the range of from about 12.0 lbm/gal to about 16.0 lbm/gal. In some embodiments, the set-delayed geopolymer cement compositions may include a means to reduce their densities, such as hollow microspheres, low-density elastic beads, or other density-reducing additives known in the art. In one or more embodiments, the density may be reduced after storing the composition, but prior to placement in a subterranean formation. Those of ordinary skill in the art, with the benefit of this disclosure, will recognize the appropriate density for a particular application.

In certain embodiments, the set-delayed geopolymer cement compositions may exhibit a delayed set in that they remain in a pumpable fluid state for an extended period of time. In some embodiments, the set-delayed geopolymer cement compositions may remain in a pumpable fluid state for a period of time from about 1 days to about 60 days or more. In other embodiments, the set-delayed geopolymer cement compositions may remain in a pumpable fluid state for a period of time from about 1 days to about 21 days or more. In still other embodiments, the set-delayed geopolymer cement compositions may remain in a pumpable fluid state for a period of time from about 1 days to about 14 days or more. A fluid may be considered to be in a pumpable fluid state where the fluid has a consistency of less than 70 Bearden units of consistency ("Bc"), as measured on a high-temperature high-pressure consistometer at room temperature (e.g., about 80° F.) in accordance with the procedure for determining cement thickening times set forth in API RP Practice 10B-2, Recommended Practice for Testing Well Cements, First Edition, July 2005.

In one or more embodiments, the set-delayed cement compositions may be activated (e.g., by combination with an ELS activator), when desired for use, to set into a hardened mass. The term "cement set activator" or "ELS activator", as used herein, refers to an additive that activates a set-delayed or heavily retarded cement composition and also may accelerate the setting of the set-delayed, heavily retarded, or other cement composition. Without intending to be limited to any theory or mechanism, the ELS activator may be used to activate the set-delayed cement compositions by reducing the ability of the set retarder to inhibit consolidation of the geopolymer cement composition. By way of example, embodiments of the set-delayed cement compositions may be activated to form a hardened mass. For example, embodiments of the set-delayed cement compositions may set to form a hardened mass in a time period ranging between any of and/or including any of about 8 hours, about 12 hours, less than about 24 hours, about 1 day, about 2 days, about 4 days, about 6 days, about 8 days, about 10 days, or about 12 days. In certain embodiments, an ELS activator may be added to the set-delayed geopolymer cement compositions at the time it is mixed.

In some embodiments, the ELS activator may be an ELS activator solution including hydrated lime (i.e., calcium hydroxide), a dispersant, and water. In one or more embodiments, the hydrated lime may be present in an amount of from about 25% to about 50% by weight of the ELS activator solution. In other embodiments, the hydrated lime may be present in an amount of from about 35% to about 45% by weight of the ELS activator solution. In still other embodiments, the hydrated lime may be present in an amount of from about 42% to about 44% by weight of the ELS activator solution. In one or more embodiments, the dispersant may be present in an amount of from about 0.005% to about 1.0% by weight of the ELS activator solution. In other embodiments, the dispersant may be present in an amount of from about 0.010% to about 0.030 by weight of the ELS activator solution. In still other embodiments, the dispersant may be present in an amount of from about 0.015% to about 0.025% by weight of the ELS activator solution. In some embodiments, the geopolymer and the hydrated lime may be present in a weight ratio of geopolymer to hydrated lime of about 38:1 to about 48:1. In certain embodiments, the ELS activator may be an ELS activator solution including Portland cement and water. In one or more embodiments, the Portland cement may be present in an amount of from about 25% to about 80% by weight of the ELS activator solution. In other embodiments, the Portland cement may be present in an amount of from about 50% to about 70% by weight of the ELS activator solution. In still other embodiments, the Portland cement may be present in an amount of from about 60% to about 68% by weight of the ELS activator solution.

In certain embodiments, the ELS activator may be an ELS activator solution including Portland cement, a retarder, and a suspending aid. In some embodiments, the suspending aid may be diutan gun. In one or more embodiments, the Portland cement may be present in an amount of from about 25% to about 80% by weight of the ELS activator solution. In other embodiments, the Portland cement may be present in an amount of from about 50% to about 70% by weight of the ELS activator solution. In still other embodiments, the Portland cement may be present in an amount of from about 55% to about 65% by weight of the ELS activator solution. In one or more embodiments, the retarder may be present in an amount of from about 0.05% to about 1.0% by weight of the ELS activator solution. In other embodiments, the retarder may be present in an amount of from about 0.10% to about 0.50% by weight of the ELS activator solution. In still other embodiments, the retarder may be present in an amount of from about 0.25% to about 0.35% by weight of the ELS activator solution.

In certain embodiments, the set-delayed geopolymer cement compositions may be activated to form a hardened mass in a time period in the range of from about 0.50 hours to about 72.0 hours. In other embodiments, the set-delayed geopolymer cement compositions may be activated to set to form a hardened mass in a time period in the range of from about 2.0 hours to about 24.0 hours. In still other embodiments, the set-delayed geopolymer cement compositions may be activated to set to form a hardened mass in a time period in the range of from about 4.0 hours to about 12.0 hours. In some embodiments, after activation, the set-delayed geopolymer cement composition may develop a 24-hour compressive strength in the range of from about 25.0 psi to about 5000.0 psi. In other embodiments, the set-delayed geopolymer cement composition may develop a 24-hour compressive strength in the range of from about 50.0 psi to about 3000.0 psi. In still other embodiments, the set-delayed geopolymer cement composition may develop a 24-hour compressive strength in the range of from about 100.0 psi to about 2000.0 psi. The compressive strengths may be determined in accordance with API RP 10B-2, Recommended Practice for Testing Well Cements, First Edition, July 2005, using an UCA at 140° F. while maintained at 3000 psi.

In certain embodiments, an accelerator may be added to the set-delayed geopolymer compositions of the present disclosure to increase the rate of setting of the set-delayed geopolymer compositions after activation. In other words, the accelerator may increase the rate at which compressive strength develops. In some embodiments, suitable cement set accelerators include, but are not limited to, calcium chloride, triethanolamine, sodium silicate, zinc formate, calcium acetate, sodium hydroxide, sodium sulfate, and combinations thereof. In one or more embodiments, the cement set accelerator may be added to embodiments of the set-delayed geopolymer cement composition in an amount sufficient to activate the geopolymer composition to at least partially consolidate into a hardened mass. In some embodiments, the cement set accelerator may be added to the set-delayed geopolymer cement composition in an amount in the range of about 0.1% to about 50.0% by weight of the geopolymer composition. In other embodiments, the cement set accelerator may be added to the set-delayed geopolymer cement composition in an amount in the range of about 1.0% to about 30.0% by weight of the geopolymer composition. In still other embodiments, the cement set accelerator may be added to the set-delayed geopolymer cement composition in an amount in the range of about 5.0% to about 50.0% by weight of the geopolymer composition. One of ordinary skill in the art, with the benefit of this disclosure, will recognize the appropriate amount of the cement set accelerator to include for a chosen application.

As will be appreciated by those of ordinary skill in the art, embodiments of the set-delayed geopolymer cement compositions of the present disclosure may be used in a variety of subterranean operations, including primary and remedial cementing. In some embodiments, a set-delayed geopolymer cement composition may be provided that includes geopolymer compositions, hydrated lime, a set retarder, and optionally a dispersant. In one or more embodiments, the set-delayed geopolymer cement composition may be introduced into a subterranean formation and allowed to at least partially consolidate therein. As used herein, introducing the set-delayed geopolymer cement composition into a subterranean formation includes introduction into any portion of the subterranean formation, including, without limitation, into a well bore drilled into the subterranean formation, into a near well bore region surrounding the well bore, or into both. Embodiments of the present disclosure may further include activation of the set-delayed geopolymer cement composition. The activation of the set-delayed geopolymer cement composition may include, for example, addition of a cement set accelerator to the set-delayed geopolymer cement composition.

In some embodiments, a set-delayed geopolymer cement composition may be provided that includes geopolymer compositions, hydrated lime, a set retarder, and optionally a dispersant. The set-delayed geopolymer cement composition may be stored, for example, in a vessel or other suitable container. In one or more embodiments, the set-delayed geopolymer cement composition may be permitted to remain in storage for a desired time period. In some embodiments, the set-delayed geopolymer cement composition may remain in storage for a time period of about 1 day or longer. For example, the set-delayed geopolymer cement composition may remain in storage for a time period of about 1 day, about 2 days, about 5 days, about 7 days, about 10 days, about 20 days, about 30 days, about 40 days, about 50 days, about 60 clays, or longer. In some embodiments, the set-delayed geopolymer cement composition may remain in storage for a time period in a range of from about 1 day to about 7 days or longer. Thereafter, the set-delayed geopolymer cement composition may be activated, for example, by addition of a cement set accelerator, introduced into a subterranean formation, and allowed to set therein.

In primary cementing embodiments, for example, embodiments of the set-delayed geopolymer cement composition may be introduced into a space between a wall of a well bore and a conduit (e.g., pipe strings, liners) located in the well bore, the well bore penetrating the subterranean formation. The set-delayed geopolymer cement composition may be allowed to set to form an annular sheath of hardened cement in the space between the well bore wall and the conduit. Among other things, the set cement composition may form a barrier, preventing the migration of fluids in the well bore. The set cement composition also may, for example, support the conduit in the well bore.

In remedial cementing embodiments, a set-delayed geopolymer cement composition may be used, for example, in squeeze-cementing operations or in the placement of cement plugs. By way of example, the set-delayed composition may be placed in a well bore to plug an opening, such as a void or crack, in the formation, in a gravel pack, in the conduit, in the cement sheath, and/or a microannulus between the cement sheath and the conduit.

In some embodiments, the set-delayed geopolymer cement compositions of the present disclosure may include a weighting agent. Examples of suitable solid weighting agents include, but are not limited to barite, hematite, calcium carbonate, magnesium carbonate, iron carbonate, zinc carbonate, manganese tetraoxide, ilmenite, and any combination thereof. These weighting agents may be at least partially soluble or insoluble in the cementing fluid. In some embodiments, a weighting agent may be present in the set-delayed geopolymer cement compositions in an amount of from about 1% to about 60% by weight of the cementing fluid. In some embodiments, the weighting agents may be present in the set-delayed geopolymer cement compositions in an amount of from about 1% to about 35% by weight of the cementing fluid. In some embodiments, the weighting agent may be present in the set-delayed geopolymer cement compositions in an amount of from about 1% to about 10% by weight of the cementing fluid. Alternatively, the amount of weighting agent may be expressed by weight of dry solids. For example, the weighting agent may be present in an amount of from about 1% to about 99% by weight of dry solids. In some embodiments, the weighting agent may be present in an amount of from about 1% to about 20% and, alternatively, from about 1% to about 10% by weight of dry solids.

In certain embodiments, the treatment fluids of the present disclosure optionally may include any number of additional additives. Examples of such additional additives include, but are not limited to, resins; latex; stabilizers; silica; pozzolans; microspheres; aqueous superabsorbers; viscosifying agents; suspending agents; dispersing agents; salts; accelerants; surfactants; retardants; foamers, defoamers; settling-prevention agents; weighting agents; fluid loss control agents; elastomers; vitrified shale; gas migration control additives; formation conditioning agents; and combinations thereof. In some embodiments, the treatment fluid may contain rheology (viscosity and gel strength) modifiers and stabilizers. A person skilled in the art, with the benefit of this disclosure, will recognize the types of additives that may be included in the fluids of the present disclosure for a particular application.

Certain components of the cementing fluid may be provided as a "dry mix" to be combined with the base fluid and/or other components prior to or during introducing the cementing fluid into the subterranean formation. In some embodiments, dry mix compositions may be designed to include a base fluid in an amount from about 1 to about 20 gallons per 94-lb sack of dry blend (gal/sk). In certain embodiments, dry mix compositions may be suitable for base fluids in the amount of 10 gal/sk. In some embodiments, dry mix compositions may be suitable for base fluids in the amount of 13.5 gal/sk. Embodiments of the set-delayed geopolymer cement compositions of the present disclosure may be prepared in accordance with any suitable technique. In some embodiments, the desired quantity of water may be introduced into a mixer (e.g., a cement blender) followed by the dry blend. The dry blend may include the geopolymer and additional solid additives, for example. Additional liquid additives, if any, may be added to the water as desired prior to, or after, combination with the dry blend. This mixture may be agitated for a sufficient period of time to form a slurry. It will be appreciated by those of ordinary skill in the art, with the benefit of this disclosure, other suitable techniques for preparing set-delayed geopolymer cement compositions may be used in accordance with embodiments of the present disclosure.

In some embodiments, the set-delayed geopolymer cement compositions may further include a lightweight additive. The lightweight additive may be included to reduce the density of embodiments of the set-delayed geopolymer cement compositions. For example, the lightweight additive may be used to form a lightweight cementing fluid having a density of less than about 13 lbm/gal. The lightweight additive typically may have a specific gravity of less than about 2.0. Examples of suitable lightweight additives may include, but are not limited to hollow microspheres, gilsonite, perlite, and any combinations thereof. In certain embodiments, the lightweight additive may be present in an amount of from about 0.1% to about 30% by weight of dry solids. In certain embodiments, the lightweight additive may be present in an amount of from about 1% to about 15% by weight of dry solids. In certain embodiments, the lightweight additive may be present in an amount from about 0.01% by weight of a weighting agent in the cementing fluid to about 10% by weight of a weighting agent.

In certain embodiments, the set-delayed geopolymer cement compositions of the present disclosure may include lost circulation materials or bridging agents. In certain embodiments, lost circulation materials may include, but are not limited to, resilient graphitic carbon, ground walnut shells, calcium carbonate and polymers, and the like, and any combination thereof. In certain embodiments, the cementing fluid does not include a lost circulation material. In certain embodiments, the cementing fluid does not include a bridging agent. In some embodiments, the cementing fluid is free or substantially free of particulates.

In certain embodiments, the set-delayed geopolymer cement compositions of the present disclosure may be suitable for use at a variety of temperatures, pH levels, water salinities, and mineralogies of subterranean formations. In some embodiments, the materials that make up the set-delayed geopolymer cement compositions function at temperatures above 400° F. (204.4° C.) and thus the behavior of the compositions is likely to be unaffected at temperatures above 400° F. (204.4° C.). Thus, in certain embodiments, the set-delayed geopolymer cement compositions may provide effective fluid displacement, loss zone treatment, or both, even when used in conditions at or above 400° F. (204.4° C.). Moreover, the properties of set-delayed geopolymer cement compositions may be effective over a range of pH levels. For example, in certain embodiments, the set-delayed geopolymer cement compositions may provide effective fluid displacement and loss zone treatment from a pH of about 7 to about 12. Additionally, the set-delayed geopolymer cement compositions of the present disclosure may be suitable for a variety of subterranean formations, including, but not limited to shale formations and carbonate formations.

In certain embodiments, the set-delayed geopolymer cement compositions may further include a free water control additive. As used herein, the term "free water control additive" refers to an additive included in a liquid for, among other things, reducing (or preventing) the presence of free water in the liquid. Free water control additives also may reduce (or prevent) the settling of solids. Examples of free water control additives suitable for certain embodiments of the present disclosure include, but are not limited to, bentonite, amorphous silica, hydroxyethyl cellulose, and any combination thereof. The free water control additive may be provided as a dry solid in some embodiments. In certain embodiments, the free water control additive may be present in an amount of from about 0.1% to about 16% by weight of a weighting agent in the cementing fluid. In some embodiments, the free water control additive may be present in an amount of from about 0.1% to about 2% by weight of the weighting agent. In certain embodiments, the free water control additive may be present in the cementing fluid in an amount from about 0.2 lbm/bbl to about 10 lbm/bbl.

Figure 2:
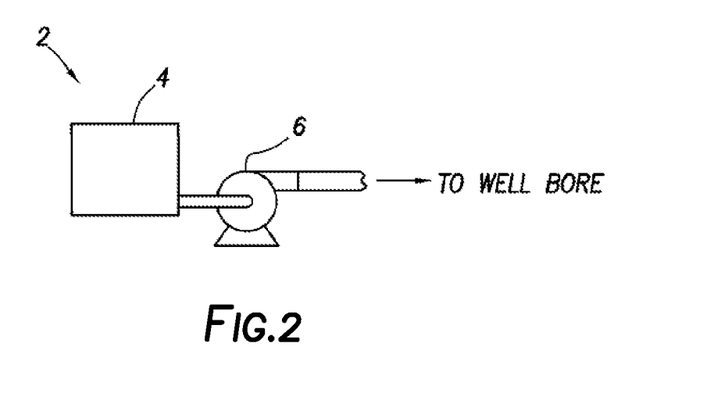
FIG. 2 is a schematic representation of a system that may be used in the preparation of a set-delayed geopolymer cement composition in accordance with certain embodiments.

Referring now to FIG. 2, a system that may be used in the preparation of a cement composition in accordance with example embodiments will now be described. FIG. 2 illustrates a system 2 for preparation of a cement composition and delivery to a well bore in accordance with certain embodiments. As shown, the cement composition may be mixed in mixing equipment 4, such as a jet mixer, re-circulating mixer, or a batch mixer, for example, and then pumped via pumping equipment 6 to the well bore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the well bore.

Figure 3A:
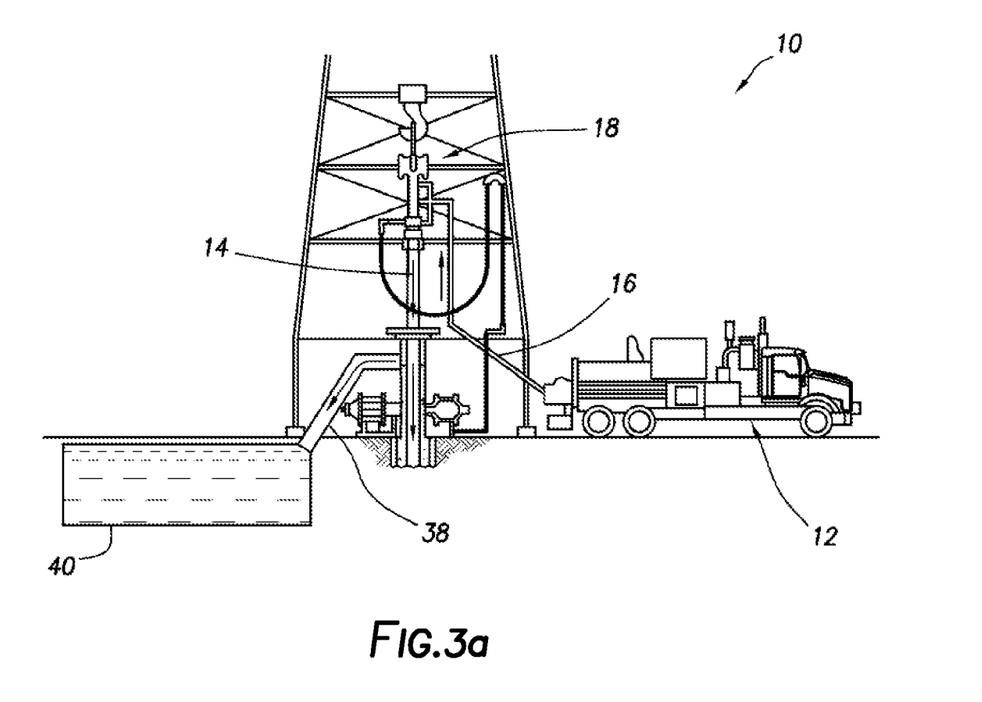
FIG. 3a is a schematic representation of surface equipment that may be used in placement of a set-delayed geopolymer cement composition in accordance with certain embodiments.

An example technique and system for placing a cement composition into a subterranean formation will now be described with reference to FIG. 3a and FIG. 3b. FIG. 3a illustrates surface equipment 10 that may be used in placement of a cement composition in accordance with certain embodiments. It should be noted that while FIG. 3a generally depicts a land-based operation, those skilled in the art will readily recognize that the principles described herein are equally applicable to subsea operations that employ floating or sea-based platforms and rigs, without departing from the scope of the disclosure. As illustrated by FIG. 3a, the surface equipment 10 may include a cementing unit 12, which may include one or more cement trucks. The cementing unit 12 may include mixing equipment 4 and pumping equipment 6 (e.g., FIG. 2) as will be apparent to those of ordinary skill in the art. However, in some embodiments, the cement compositions of the present disclosure may be mixed prior to delivery to the wellbore operation. In embodiments where the cement composition is mixed prior to delivery to the wellbore operation, the footprint of the operation equipment may be reduced. The cementing unit 12 may pump a cement composition 14 through a feed pipe 16 and to a cementing head 18 which conveys the cement composition 14 downhole. Surface equipment 10 may include one or more retention pits 40 (e.g., a mud pit) connected to the wellbore via a flow line 38.

Figure 3B:
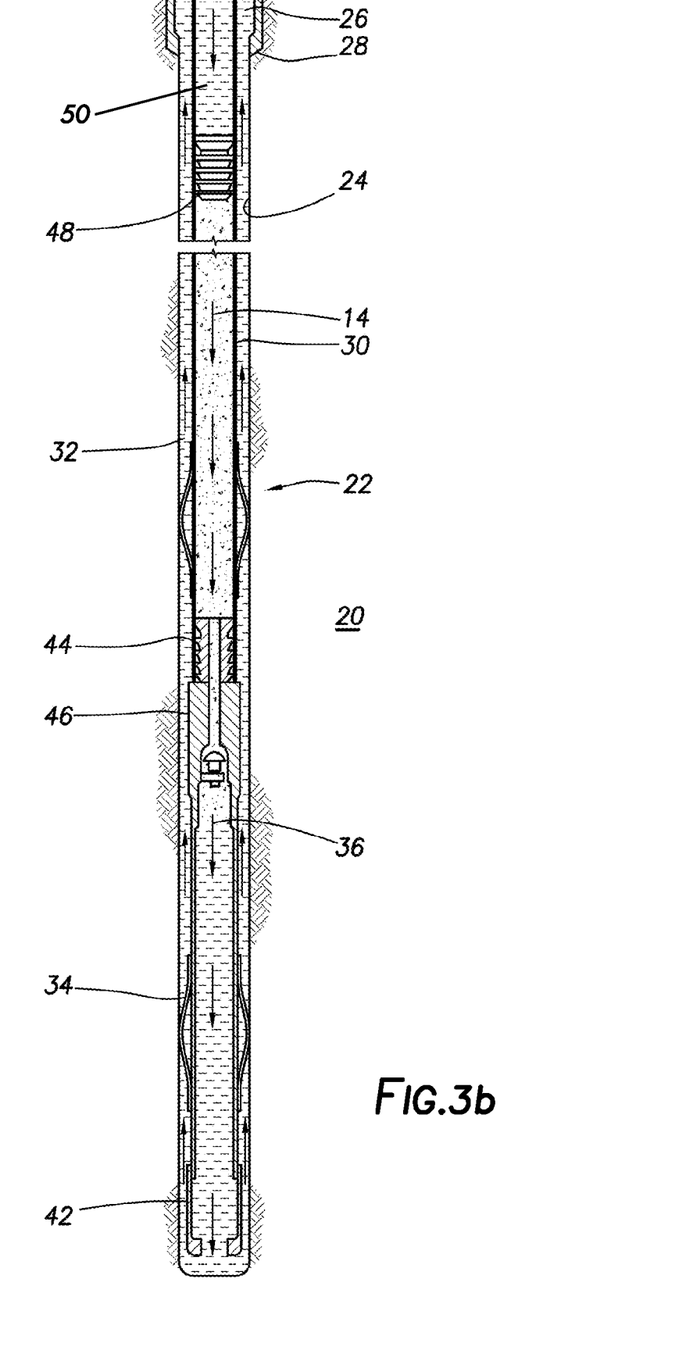
FIG. 3b is a schematic representation of downhole equipment that may be used in placement of a set-delayed geopolymer cement composition in accordance with certain embodiments.

Turning now to FIG. 3b, the cement composition 14 may be placed into a subterranean formation 20 in accordance with example embodiments. In some embodiments, the cement composition 14 may be introduced into the subterranean formation 20 at the same time as the ELS activator. In other embodiments, the cement composition 14 may be introduced into the subterranean formation 20 before the ELS activator. As illustrated, a well bore 22 may be drilled into the subterranean formation 20. While well bore 22 is shown extending generally vertically into the subterranean formation 20, the principles described herein are also applicable to well bores that extend at an angle through the subterranean formation 20, such as horizontal and slanted well bores. As illustrated, the well bore 22 includes walls 24. In the illustrated embodiments, a surface casing 26 has been inserted into the well bore 22. The surface casing 26 may be cemented to the walls 24 of the well bore 22 by cement sheath 28. In the illustrated embodiment, one or more additional conduits (e.g., intermediate casing, production casing, liners, etc.) shown here as casing 30 also may be disposed in the well bore 22. As illustrated, there is a well bore annulus 32 formed between the casing 30 and the walls 24 of the well bore 22 and/or the surface casing 26. One or more centralizers 34 may be attached to the casing 30, for example, to centralize the casing 30 in the well bore 22 prior to and during the cementing operation.

With continued reference to FIG. 3b, the cement composition 14 may be pumped down the interior of the casing 30. The cement composition 14 may be allowed to flow down the interior of the casing 30 through the casing shoe 42 at the bottom of the casing 30 and up around the casing 30 into the well bore annulus 32. The cement composition 14 may be allowed to set in the well bore annulus 32, for example, to form a cement sheath that supports and positions the casing 30 in the well bore 22. While not illustrated, other techniques also may be utilized for introduction of the cement composition 14. By way of example, reverse circulation techniques may be used that include introducing the cement composition 14 into the subterranean formation 20 by way of the well bore annulus 32 instead of through the casing 30.

As it is introduced, the cement composition 14 may displace other fluids 36, such as drilling fluids and/or spacer fluids, that may be present in the interior of the casing 30 and/or the well bore annulus 32. At least a portion of the displaced fluids 36 may exit the well bore annulus 32 via a flow line 38 and be deposited, for example, in one or more retention pits 40 (e.g., a mud pit), as shown on FIG. 3a.

Referring again to FIG. 3b, a bottom plug 44 may be introduced into the well bore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 3b, the bottom plug 44 is shown on the landing collar 46. In the illustrated embodiment, a top plug 48 may be introduced into the well bore 22 behind the cement composition 14. The top plug 48 may separate the cement composition 14 from a displacement fluid 50 and also push the cement composition 14 through the bottom plug 44.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

Example 1

A set-delayed geopolymer cement composition was prepared with the formulation shown in Table 1 below. The sodium silicate solution was obtained from a commercial source and its composition was 37.6 wt. % sodium silicate and 63.4 wt. % water with a $SiO_2:Na_2O$ ratio of 3.22. The formulation in Table 1 below was mixed in the following manner: (1) the NaOH was added to the sodium silicate solution while stirring and then allowed to cool before proceeding; (2) the metakaolin and silica sand were dry blended together; (3) the mixture created in step (1) was added to a blender jar and the blender was set at 3000 rpm; (4) the dry blended powder from step (2) was slowly added to the liquid in the blender; (5) the blender speed was increased to 5000 rpm the mixture was agitated until homogenous; and (6) a potassium pentaborate retarder was then added to the blender and the mixture was blended at 5000 rpm for 30 seconds.

TABLE 1

| Formulation for geopolymer set-delayed cement GP-ELS 5. | |
| --- | --- |
| Material | Weight (g) |
| Metakaolin | 225.0 |
| Silica Sand | 400.4 |
| Sodium Silicate Solution | 337.4 |
| NaOH | 13.5 |
| Potassium Pentaborate Octahydrate | 13.7 |
| Water | 50.8 |

This formulation produced a geopolymer slurry with a calculated slurry density of 16.9 ppg. After blending, the mixture was transferred to a 1.0 liter plastic bottle and stored at ambient conditions.

On the same day, an ELS activator solution was also prepared with the formulation shown in Table 2 below. This ELS activator solution was mixed in the following manner: (1) water was added to a blender jar; (2) the blender was started and the speed was increased to 5000 rpm; (3) the hydrated lime was then added in, slowly; and (4) the dispersant was added and the mixture was blended at 5000 rpm for 30 seconds to ensure homogeneity.

TABLE 2

Formulation for hydrated lime extended life geopolymer ELS activator.

| Material | Weight (g) |
|---|---|
| Hydrated Lime | 300 |
| Water | 390 |
| PCE Dispersant | 0.14 |

This formulation produced an ELS activator slurry with a calculated slurry density of 11.1 ppg. After blending, the mixture was transferred to a 1.0 liter plastic bottle and stored at ambient conditions.

Both formulations were stored in the laboratory at about 70° F. (21.1° C.). The rheology of each formulation was measured regularly over several days to ensure they both stayed in a flowable state. The rheological measurements were obtained using a Model 35A Fann Viscometer with a Fann Yield Stress Adapter ("FYSA") in accordance with the procedure set forth in API RP Practice 10B-2, Recommended Practice for Testing Well Cements. The data is presented in Table 3 below.

TABLE 3

Rheological values of the geopolymer set-delayed cement and ELS activator slurry

| Sample Name | Age (Days) | FYSA Readings | | | | | | | Herschel-Buckley | |
|---|---|---|---|---|---|---|---|---|---|---|
| | | 3 rpm | 6 rpm | 30 rpm | 60 rpm | 100 rpm | 200 rpm | 300 rpm | YP (lbf/100 ft^2) | Mu ∞ (cP) |
| GP-ELS 5 base | 0 | 96 | 100.7 | 131.2 | 165 | 208.5 | 306.2 | >300 | 141 | 4391 |
| | 1 | 175.2 | 173.7 | 194.2 | 216.9 | 239.9 | 286.7 | >300 | 293 | 1832 |
| | 4 | 180 | 190 | 212 | 233 | 258 | 314 | >300 | 311 | 2170 |
| ELS activator | 0 | 30.7 | 31.9 | 39.8 | 44.6 | 48.1 | 55 | 60.4 | 39 | 123 |
| | 5 | 43.9 | 47.8 | 61.1 | 74.8 | 86.9 | 109.2 | 127.8 | 47 | 116 |

As shown by these measurements, the GP-ELS had a relatively high viscosity (Mu∞) and yield point (YP), however, the slurry remained flowable and in liquid form for at least 4 days. No settling of solids or free fluid was observed in the sample over the test period. The ELS activator slurry remained fluid for at least 6 days and exhibited a relative constant viscosity and yield, as shown in Table 2. No settling of solids or free fluid was observed in the sample over the test period.

After 4 days of storage in the liquid state at ambient laboratory conditions, the ELS activator and base were mixed together to determine if the slurry would form a set, hardened material. To activate the GP-ELS, 15.0 grams of ELS activator solution was mixed with 300.0 grams of GP-ELS 5 base slurry to give an activated slurry with a calculated density of 16.6 ppg. After mixing, the activated set-delayed cement was poured into 2"×5" cylinders. One cylinder was cured at 70° F. (21.1° C.) and atmospheric pressure for 48 hours. A second cylinder was cured at 140° F. and atmospheric pressure for 24 hours. Compressive strength crush testing was performed using a Tinius Olsen mechanical press in accordance with API RP Practice 10B-2, and the results are shown below in Table 4 below.

TABLE 4

Compressive strength crush values of activated GP-ELS 5

| Material | Temp (F.) | Time | C.S. (psi) |
|---|---|---|---|
| Sample 1 | 70.0 | 48 | 60 |
| Sample 2 | 140.0 | 24 | 2200 |

The results in Table 4 indicate that after being stored in the liquid state for extended periods of time, the GP-ELS has the ability to be activated and can develop compressive strength, even at temperatures as low as 70° F. (21.1° C.). For comparison, the original Pumice-Lime (pozzolanic) ELS did not develop compressive strength at 70° F. (21.1° C.) and only developed 432 psi at 140° F. (60° C.) under the same conditions.

Example 2

A geopolymer based set-delayed geopolymer cement composition was prepared with the formulation shown in Table 5 below. The sodium silicate solution was obtained from a commercial source and its composition was 37.6 wt. % sodium silicate and 63.4 wt. % water with a $SiO_2:Na_2O$ ratio of 3.22. The formulation below was mixed in the following manner to give GP-ELS 6 base slurry with a slurry density of 16.2 ppg: (1) the NaOH was added to the sodium silicate solution while stirring and then allowed to cool before proceeding; (2) metakaolin, retarder, and silica sand were dry blended together; (3) the mixture from step (1) was added to a blender jar and the blender was set at 3000 rpm; (4) the dry blended powder from step (2) was slowly added to the liquid in the blender; and (5) the blender speed was maintained at 3500 rpm and the mixture was agitated until homogenous.

TABLE 5

Formulation for geopolymer set-delayed cement GP-ELS 6

| Material | Weight (g) |
|---|---|
| Metakaolin | 918.9 |
| Silica Sand | 1700.0 |
| Sodium Silicate solution | 1378.4 |
| NaOH | 55.1 |
| Lignosulfonate Retarder | 22.7 |
| Water | 193.9 |

After mixing, the base formulation (GP-ELS 6) was stored at 70° F. (21.1° C.) and the rheology was measured regularly over several days to ensure it stayed in flowable condition.

The rheological measurements shown in Table 6 below were obtained using a Model 35A Fann Viscometer with an FYSA in accordance with the procedure set forth in API RP Practice 10B-2, Recommended Practice for Testing Well Cements.

TABLE 6

Rheological values of the geopolymer set-delayed cement GP-ELS 6.

| Sample Name | Age (Days) | FYSA Readings | | | | | | | Herschel-Buckley | |
|---|---|---|---|---|---|---|---|---|---|---|
| | | 3 rpm | 6 rpm | 30 rpm | 60 rpm | 100 rpm | 200 rpm | 300 rpm | YP (lbf/100 ft^2) | Mu ∞ (cP) |
| GP-ELS 6 base | 0 | 21.6 | 21.9 | 27.4 | 37.2 | 49.7 | 83.3 | 118.9 | 20 | 99 |
| | 4 | 84.5 | 85.5 | 97.8 | 117.1 | 141.8 | 211.1 | 273.4 | 85 | 193 |
| | 7 | 153.3 | 154.5 | 180.0 | 205.6 | 234.9 | 316.5 | — | 159 | 261 |

As shown by the rheological measurements of GP-ELS 6 in Table 6, the set-delayed cement had a much lower viscosity and yield point than GP-ELS 5. Even after 7 days the viscosity of this slurry remained low, although the yield point increased greatly. The GP-ELS 6 slurry remained flowable and in liquid form for at least 7 days. No settling of solids or free fluid was observed in the sample over the test period To illustrate that hydrated lime, as used in Example 1, is not the only possible ELS activator, the ELS activator solution used in this example was simply a mixture of Portland cement and water, as shown in Table 7 below, with a slurry density of 15.3 ppg. This ELS activator solution was mixed in the following manner: (1) the water was first added to a beaker; (2) the cement was mixed into the water; and (3) the mixture was stirred until homogenous.

TABLE 7

Formulation for Portland cement based extended life geopolymer ELS activator.

| Material | Weight (g) |
|---|---|
| Class H Cement | 50.0 |
| Water | 25.0 |

The ELS activator solution was used immediately after preparation to activate GP-ELS 6 which had been stored for 7 days in the liquid state to determine if the activated slurry would form a set, hardened material. First, 44.0 grams of ELS activator solution was mixed with 400.0 grams of base mixture. Then, the activated set-delayed cement, with a calculated slurry density of 16.1 ppg, was poured into 2"×5" cylinders. One cylinder was cured at 70° F. (21.1° C.) and atmospheric pressure for 24 hours, while another cylinder was cured at 140° F. (60° C.) and atmospheric pressure for 24 hours, and another cylinder was cured at 180° F. (82.2° C.) and atmospheric pressure for 24 hours. Compressive strength was determined by crush testing and was performed using a Tinius Olsen mechanical press in accordance with API RP Practice 10B-2. The results are shown below in Table 8 below.

TABLE 8

Compressive strength crush values of activated GP-ELS 6

| Material | Temp (F.) | Time | C.S. (psi) |
|---|---|---|---|
| Sample 1 | 70.0 | 24 | 110 |
| Sample 2 | 140.0 | 24 | 340 |
| Sample 3 | 180.0 | 24 | 2250 |

The compressive strength results illustrate that, after storage in the liquid state for extended periods of time, the GP-ELS is activatable and develops compressive strength, even at temperatures as low as 70° F. (21.1° C.). For comparison, the original Pumice-Lime ELS, did not develop compressive strength at 70° F. (21.1° C.) and only developed 432 psi at 140° F. (60° C.) under the same conditions.

Example 3

A 16.2 ppg geopolymer set-delayed cement was prepared using the same formulation as GP-ELS 6 and stored at 70° F. (21.1° C.). An extended life Portland ELS activator solution, with a calculated slurry density of 14.0 ppg, was prepared using the formulation shown in Table 9 below. To mix, the Class H, retarder, and suspending aid were first dry blended together, then added to a blender containing the water and blended at 5000 rpm for 30 seconds.

TABLE 9

Formulation for Portland extended life ELS activator solution.

| Material | Weight (g) |
|---|---|
| Class H Portland Cement | 300.0 |
| Lignosulfonate Retarder | 1.5 |
| Suspending Aid | 0.2 |
| Water | 210.0 |

The rheology data shown in Table 10 below was taken on Day 0 and the slurry was then poured into a 1.0 liter bottle and stored at laboratory conditions (~70° F. (21.1° C.)).

TABLE 10

Rheological values of the extended life Portland ELS activator solution.

| Sample Name | Age (Days) | FYSA Readings | | | | | | | Herschel-Buckley | |
| --- | --- | --- | --- | --- | --- | --- | --- | --- | --- | --- |
| | | 3 rpm | 6 rpm | 30 rpm | 60 rpm | 100 rpm | 200 rpm | 300 rpm | YP (lbf/100 ft^2) | Mu ∞ (cP) |
| Portland ELS activator Solution | 0 | 0.7 | 0.9 | 2.5 | 3.3 | 4.8 | 9.6 | 16.3 | 0.6 | 135 |
| | 5 | 1.4 | 1.9 | 3.8 | 4.9 | 6.3 | 10.9 | 18.0 | 2.1 | 140 |

After 5 days of storage the ELS activator solution was still liquid and flowable, its rheology was measured, which is reported in Table 10. After measuring the rheology, the ELS activator solution was used to activate GP-ELS 6, which had also been aged for 5 days. First, 50.0 grams of ELS activator solution was mixed with 400.0 grams of GP-ELS 6 base mixture to give an activated slurry with a 16.0 ppg density. Then, the activated set-delayed cement was poured into a 2"×5" cylinder. The cylinder was cured at 180° F. (82.2° C.) and atmospheric pressure. After curing, the sample was crushed and had a compressive strength of 650 psi. This example illustrates that a retarded, extended life Portland ELS activator can be utilized to activate set-delayed geopolymer cements.

An embodiment of the present disclosure is a method that includes providing a set-delayed geopolymer cement composition including a geopolymer material and a set retarder; activating the set-delayed geopolymer cement composition by mixing an ELS activator to the set-delayed cement composition; introducing the set-delayed geopolymer cement composition into at least a portion of a subterranean formation; and allowing the set-delayed geopolymer cement composition to at least partially set in the subterranean formation.

In one or more embodiments described in the preceding paragraph, the geopolymer material includes an aluminosilicate source, a metal silicate source, an alkali activator, and water. In one or more embodiments described above, wherein the step of activating the set-delayed geopolymer cement composition by mixing an ELS activator to the set-delayed cement composition further includes introducing the ELS activator into the portion of the subterranean formation substantially simultaneously with introducing the set-delayed geopolymer cement composition into the portion of the subterranean formation. In one or more embodiments described above, the ELS activator includes hydrated lime, a dispersant, and water. In one or more embodiments described above, the geopolymer material and the hydrated lime are present in a weight ratio of geopolymer material to hydrated lime of about 38:1 to about 48:1. In one or more embodiments described above, the method further includes the step of introducing an ELS activator into the portion of the subterranean formation after the set-delayed geopolymer cement composition. In one or more embodiments described above, the aluminosilicate source is selected from the group consisting of a metakaolin clay, a calcined clay, a partially calcined clay, a kaolinite clay, a lateritic clay, an illite clay, a volcanic rock, a mine tailing, blast furnace slag, coal fly ash, any derivative thereof, and any combination thereof. In one or more embodiments described above, the alkali activator is a metal hydroxide. In one or more embodiments described above, the set-delayed geopolymer cement composition remains in a pumpable fluid state for at least about 1 day or more prior to activating the set-delayed geopolymer cement composition by inhibiting the ability of the set retarder to prevent consolidation of the set-delayed cement composition. In one or more embodiments described above, the set-delayed geopolymer cement composition further includes at least one additive selected from the group consisting of a weighting agent, a lightweight additive, a gas-generating additive, a lost-circulation material, and any combination thereof. In one or more embodiments described above, the set-delayed geopolymer cement composition sets to develop a 24-hour compressive strength of at least about 50 psi as measured using a destructive crush test at 140° F. (60° C.). In one or more embodiments described above, the set-delayed geopolymer cement composition is introduced into an annulus between a wall of a well bore and a conduit disposed in the well bore.

Another embodiment of the present disclosure is a composition that includes a geopolymer material including an aluminosilicate source, a metal silicate source, a metal hydroxide, and water; and a set retarder.

In one or more embodiments described in the preceding paragraph, the composition further includes an ELS activator. In one or more embodiments described above, the aluminosilicate source is selected from the group consisting of a metakaolin clay, a calcined clay, a partially calcined clay, a kaolinite clay, a lateritic clay, an illite clay, a volcanic rock, a mine tailing, blast furnace slag, coal fly ash, any derivative thereof, and any combination thereof. In one or more embodiments described above, the metal hydroxide is sodium hydroxide. In one or more embodiments described above, the set retarder is selected from the group consisting of phosphonic acid, a phosphonic acid derivative, a lignosulfonate, a salt, an organic acids, a carboxymethylated hydroxyethylated cellulose, a synthetic co- or ter-polymer including sulfonate and carboxylic acid groups, a borate compound, any derivative thereof, and any combination thereof.

Another embodiment of the present disclosure is a method that includes providing a set-delayed geopolymer cement composition including a geopolymer material, hydrated lime, a dispersant, and a set retarder, wherein the geopolymer material comprises an aluminosilicate source, a metal silicate source, a metal hydroxide, and water; activating the set-delayed geopolymer cement composition; introducing the set-delayed geopolymer cement composition into at least a portion of a subterranean formation; and allowing the set-delayed geopolymer cement composition to set in the subterranean formation.

In one or more embodiments described in the preceding paragraph, the step of introducing the set-delayed geopolymer cement composition into at least a portion of a subterranean formation includes using a pump to introduce the set-delayed geopolymer cement composition into an annulus between a wall of a well bore and a conduit disposed in the well bore. In one or more embodiments described above, the aluminosilicate source is a metakaolin clay, the metal silicate source is a sodium silicate, and the metal hydroxide is sodium hydroxide.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   first forming a set-delayed geopolymer cement composition comprising a geopolymer material and a set retarder, wherein the geopolymer material comprises an aluminosilicate source, a metal silicate source, an alkali activator, and water;
   then mixing a slurry activator into the set-delayed geopolymer cement composition to activate the set-delayed geopolymer cement composition, wherein the slurry activator comprises water and hydrated lime;
   introducing the set-delayed geopolymer cement composition into at least a portion of a subterranean formation; and
   allowing the set-delayed geopolymer cement composition to at least partially set in the subterranean formation.

2. The method of claim 1, wherein the step of mixing the slurry activator into the set-delayed geopolymer cement composition further comprises introducing the slurry activator into the portion of the subterranean formation substantially simultaneously with introducing the set-delayed geopolymer cement composition into the portion of the subterranean formation.

3. The method of claim 1, wherein the slurry activator further comprises a dispersant.

4. The method of claim 1, wherein the geopolymer material and the hydrated lime are present in a weight ratio of geopolymer material to hydrated lime of about 38:1 to about 48:1.

5. The method of claim 1, wherein the step of mixing the slurry activator into the set-delayed geopolymer cement composition further comprises introducing the slurry activator into the portion of the subterranean formation after introducing the set-delayed geopolymer cement composition into at least the portion of the subterranean formation.

6. The method of claim 1, wherein the aluminosilicate source is selected from the group consisting of a metakaolin clay, a calcined clay, a partially calcined clay, a kaolinite clay, a lateritic clay, an illite clay, a volcanic rock, a mine tailing, blast furnace slag, coal fly ash, any derivative thereof, and any combination thereof.

7. The method of claim 1, wherein the alkali activator is a metal hydroxide.

8. The method of claim 1, wherein the set-delayed geopolymer cement composition remains in a pumpable fluid state for at least about 1 day or more prior to mixing the slurry activator into the set-delayed geopolymer cement composition.

9. The method of claim 1, wherein the set-delayed geopolymer cement composition further comprises at least one additive selected from the group consisting of a weighting agent, a gas-generating additive, a lost-circulation material, and any combination thereof.

10. The method of claim 1, wherein the set-delayed geopolymer cement composition sets after mixing the slurry activator into the set-delayed geopolymer cement composition to develop a 24-hour compressive strength of at least about 50 psi as measured using a destructive crush test at 140° F. (60° C.).

11. The method of claim 1, wherein the set-delayed geopolymer cement composition is introduced into an annulus between a wall of a well bore and a conduit disposed in the well bore.

12. A method comprising:
    storing a set-delayed geopolymer cement composition for a period of about 1 day or longer, wherein the set-delayed geopolymer cement composition comprises a set retarder and a geopolymer material comprising an aluminosilicate source, a metal silicate source, a metal hydroxide, and water;
    activating the set-delayed geopolymer cement composition after storing by adding slurry activator to the set-delayed geopolymer cement composition, wherein the slurry activator comprises water and hydrated lime;
    introducing the set-delayed geopolymer cement composition into at least a portion of a subterranean formation; and
    allowing the set-delayed geopolymer cement composition to set in the subterranean formation.

13. The method of claim 12, wherein the step of introducing the set-delayed geopolymer cement composition into at least the portion of the subterranean formation comprises using a pump to introduce the set-delayed geopolymer cement composition into an annulus between a wall of a well bore and a conduit disposed in the well bore.

14. The method of claim 12, wherein the aluminosilicate source is a metakaolin clay, the metal silicate source is a sodium silicate, and the metal hydroxide is sodium hydroxide.

15. A method comprising:
    first forming a set-delayed geopolymer cement composition comprising a geopolymer material and a set retarder, wherein the geopolymer material comprises an aluminosilicate source, a metal silicate source, an alkali activator, and water;
    then mixing a slurry activator into the set-delayed geopolymer cement composition to activate the set-delayed geopolymer cement composition, wherein the slurry activator comprises water and Portland cement;
    introducing the set-delayed geopolymer cement composition into at least a portion of a subterranean formation; and
    allowing the set-delayed geopolymer cement composition to at least partially set in the subterranean formation.

16. The method of claim 15, wherein the step of mixing the slurry activator into the set-delayed geopolymer cement composition further comprises introducing the slurry activator into the portion of the subterranean substantially simultaneously with introducing the set-delayed geopolymer cement composition into the portion of the subterranean formation.

17. The method of claim 15, wherein the step of mixing the slurry activator into the set-delayed geopolymer cement composition further comprises introducing the slurry activator into the portion of the subterranean formation after introducing the set-delayed geopolymer cement composition into at least the portion of the subterranean formation.

18. The method of claim 15, wherein the aluminosilicate source is selected from the group consisting of a metakaolin clay, a calcined clay, a partially calcined clay, a kaolinite clay, a lateritic clay, an illite clay, a volcanic rock, a mine tailing, blast furnace slag, coal fly ash, any derivative thereof, and any combination thereof.

19. The method of claim 15, wherein the set-delayed geopolymer cement composition remains in a pumpable fluid state for at least about 1 day or more prior to mixing the slurry activator into the set-delayed geopolymer cement composition.

20. The method of claim 15, wherein the set-delayed geopolymer cement composition sets after mixing the slurry activator into the set-delayed geopolymer cement composition to develop a 24-hour compressive strength of at least about 50 psi as measured using a destructive crush test at 140° F. (60° C.).

\* \* \* \* \*